United States Patent [19]

Swick

[11] 4,127,250

[45] Nov. 28, 1978

[54] WIRE CLAMPING DEVICE

[75] Inventor: Edwin G. Swick, Bartlett, Ill.

[73] Assignee: ITW — Illinois Tool Works, Chicago, Ill.

[21] Appl. No.: 816,624

[22] Filed: Jul. 18, 1977

[51] Int. Cl.² .......................... H02G 3/26; F16L 3/04
[52] U.S. Cl. ...................... 248/71; 174/159; 174/165; 174/166 R; 248/216.2
[58] Field of Search .................. 174/40 CC, 157, 159, 174/164, 165, 166 R; 248/71, 216.2

[56] References Cited

U.S. PATENT DOCUMENTS

| | | | |
|---|---|---|---|
| 2,901,200 | 8/1959 | Voeks | 174/164 X |
| 3,241,797 | 3/1966 | Anderson | 248/71 |
| 3,498,575 | 3/1970 | Downing | 248/71 |

FOREIGN PATENT DOCUMENTS

| | | | |
|---|---|---|---|
| 1,075,184 | 2/1960 | Fed. Rep. of Germany | 174/164 |
| 1,077,284 | 3/1960 | Fed. Rep. of Germany | 174/164 |
| 1,206,504 | 12/1965 | Fed. Rep. of Germany | 174/157 |
| 1,366,144 | 6/1964 | France | 174/159 |

Primary Examiner—Laramie E. Askin
Attorney, Agent, or Firm—Jack R. Halvorsen; Robert W. Beart

[57] ABSTRACT

A block member having a pair of pins preassembled therein and including a recess in its bottommost, workpiece engaging surface. The recess is configured to accept a wire member and incorporates means to preassemble the clip to the wire prior to association with a work surface. The recess further includes a protuberance serving as a strain relief feature when the device and wire are clamped against the work surface.

7 Claims, 7 Drawing Figures

WIRE CLAMPING DEVICE

BACKGROUND OF THE INVENTION

The present invention relates generally to an improved device for clampingly securing a wire to a work surface.

Clamping devices of this general type have been known and utilized with varying degrees of effectiveness. The prior art consists of many such devices ranging from staples with compressible bridge material to clamps having pin-like devices preassembled therein with recesses formed to be placed over the associated wire, clamping the wire to the workpiece.

However, the prior art devices are not all readily adaptable for use with a variety of work surfaces, such as concrete, wood, etc. Furthermore, none of the prior art devices are particularly designed to permit preassembly of the device on the wire prior to clamping of the wire to the workpiece. Furthermore, when the prior art devices are to be used with a concrete-type work surface, care must be taken so that pins can be effectively driven into such a surface without damaging the work surface and still insure that a tight clamping attachment is obtained.

When using the clamping device of the present invention, many of the problems existing in the prior art devices are overcome. The present invention advantageously includes a recess having a restricted mouth area which facilitates the snapping or preassembly of the device to a wire so that the wire and associated devices can be transported to the desired location on the work surface and rapidly and efficiently installed thereon.

A further advantage of the present invention is the incorporation of a protuberance in the recess to compressingly embed into the associated wire when clamped on the workpiece, serving as a means to relieve the stress on the wire in the longitudinal direction.

The novel configuration of the bores, which receive the attaching pin, in the present invention enables the clip device to be manufactured efficiently as well as used effectively.

Many other objects, features and advantages of the present invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
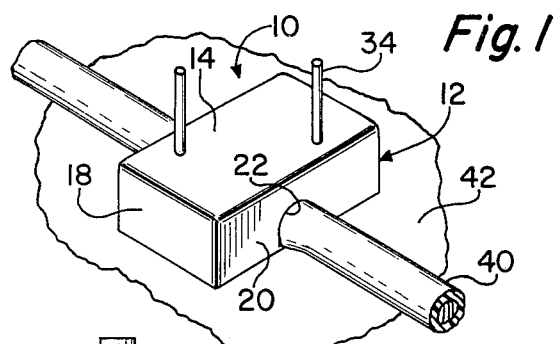
FIG. 1 is a perspective view of the clip shown clamping a wire to a workpiece.
Figure 2:
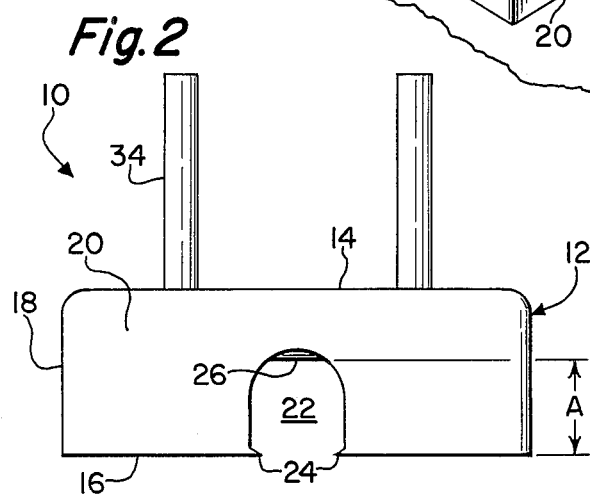
FIG. 2 is an end view of the clip.
Figure 3:
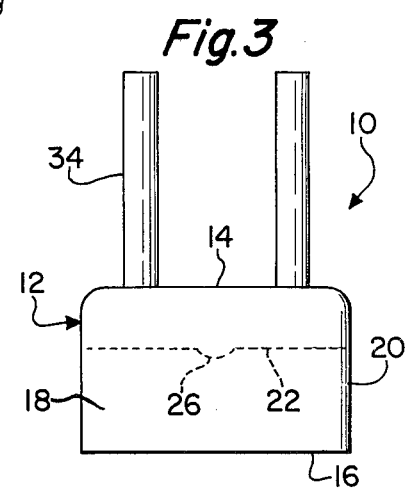
FIG. 3 is a side view of the clip.
Figure 4:
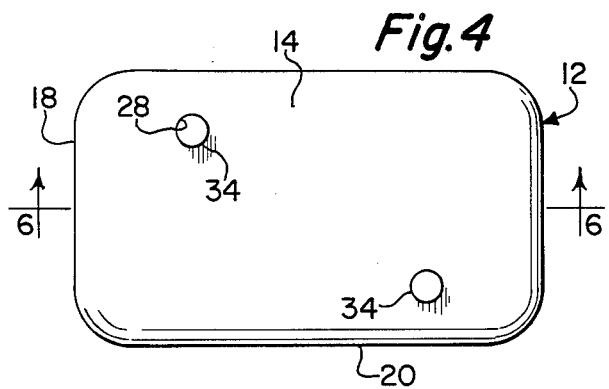
FIG. 4 is a top plan view of the clip.
Figure 5:
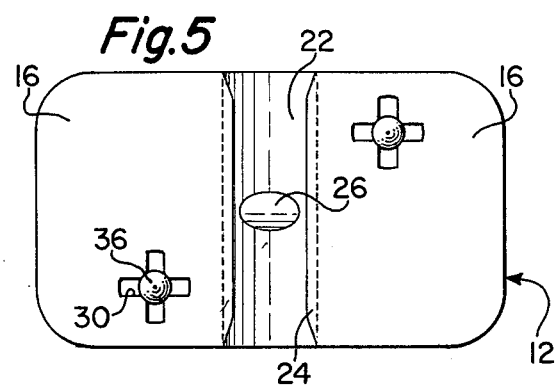
FIG. 5 is a bottom plan view of the clip.

Referring now to the drawings and more particularly to FIG. 1, it will be seen that the wire clamping clip assembly 10 comprises basically a block member 12 and a pair of pins 34 positioned in bores formed in the block. The pins 34 will be prepositioned so the pointed end regions 36 thereof are within the bores with a driving end portion extending above the upper surface of the block.

The upper and lower surfaces 14 and 16, respectively, will be generally planar and parallel to each other. However, the bottom surface 16 includes a recess 22 completely traversing the block in a given direction. The block is preferably rectangular and thus includes a pair of parallel end surfaces 20 intersecting the recess and a pair of parallel side surfaces 18. The recess will preferably extend parallel to side surfaces 18 and be positioned midway therebetween. The pins 34 will be positioned in through bores located on either side of the recess and the pins will preferably be aligned so as to be diagonally disposed relative to the rectangular configuration, for purposes to be described later herein. The pins will also preferably be a length equal to at least about twice the thickness of the block to achieve the necessary embedment.

Figure 6:
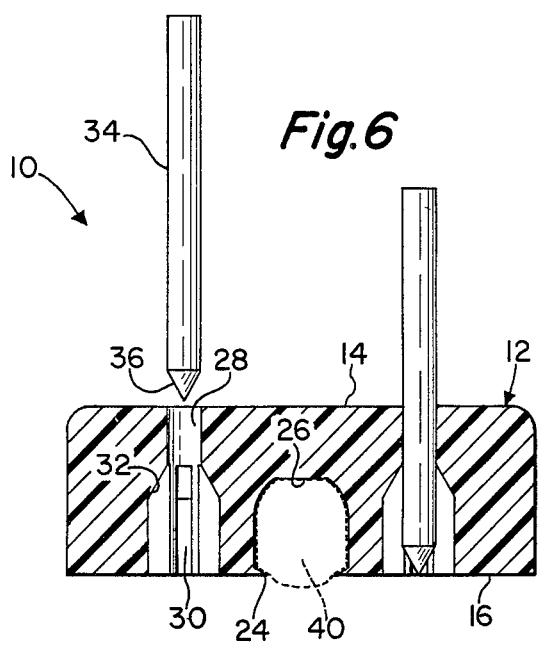
FIG. 6 is a cross-sectional view of the clip as taken along Line 6—6 of FIG. 4, additionally showing, in dotted line configuration, a wire associated with the clip.
Figure 7:
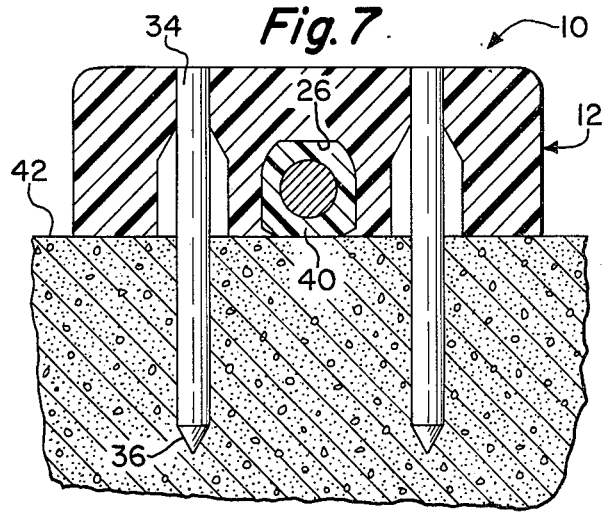
FIG. 7 is a sectional view, similar to that of FIG. 6, but showing the clip in its final clamping cooperation with a wire and workpiece.

Attention is directed to the protrusions 24 forming a restricted mouth region for the recess. These protrusions are shown in the preferred embodiment to be flap-like continuations of the flat bottom surface 16 extending into the mouth of the recess. Extensions 24 thus serve to frictionally engage the wire, as shown in FIG. 6, so that the clip or a plurality of clips may be preassembled to a length of wire. Such a feature is highly desirable in situations where access to the desired location on the work surface is limited or when a more efficient assembly technique is desired. It will be apparent that the transverse dimension of the recess defined by flaps 24 will be substantially less than the maximum transverse dimension of the recess and the diameter of the wire 40.

A further feature incorporated in the recess is the bump or protuberance 26 located on the top wall of the recess. In operation, this protuberance embeds or compresses into the wire serving as a force concentration at that point and creating a significant resistance to movement of the wire 40 longitudinally of the recess, since the diameter of the wire 40 will also be greater than the dimension "A" between protuberance 26 and bottom surface 16. This protuberance thus serves as a strain relief feature in the system and prevents movement of the wire relative to the clip assembly 10, which would with time contribute to the loosening of the clamping desired.

Attention is now directed to the particular configuration of the bore into which the pin 34 is inserted. Reference to FIGS. 4 through 7 will reveal that the bore actually is comprised primarily of two regions, an upper region 28 and a lower region 30. The upper region, which intersects the upper block surface 14, will be generally cylindrical in cross section and of a diameter substantially equal or even slightly less than the outer diameter of the pin 34. This effects a firm force fit between the two elements, insuring that the preassembly of the pin to the block will remain intact during shipping, installation, handling, etc. The lowermost region 30, which intersects the workpiece engaging surface 16, is shown as a generally cruciform shape. The preferred embodiment of lower bore region 30 includes slots intersecting one another at right angles and extending radially from a diameter which is essentially a continuation of the upper region 28. Such a lower bore configuration limits the surface contact between the bore and the pin but maintains a balanced, longitudinal line contact between the same elements.

With a bore configuration described herein, the friction to be overcome by the pins 34 during driving is minimized without compromising the tight preassembly of pins to the block. With the use of the ribs, formed by the cruciform region 30, the pin 34 is kept in vertical alignment relative to the work surface. This becomes important when the work surface is concrete or any similarly hard surface. The lower region 30 does, however, permit slight angular adjustment of the pin during driving to accommodate hard aggregate, etc. which may be present in the work surface 42.

A further important advantage of the configuration of the bore is that it contributes to the efficient production of the block member 12. Since the block will preferably be constructed of plastic and an injection molding process is preferably utilized to produce blocks 12, slender core pins must be formed in the mold to create the bores. With the typical dimension of the pins 34 used with the invention being a length of one-half inch and a diameter of 0.05 inch, a core pin having a continuous cylindrical dimension corresponding to this dimension would create a very short tool life for the production of such a part. However, if a core pin generally of the configuration shown in producing the composite bore 28, 32 and 30 is used, the base of such a core pin will be extremely strong in resisting bending movement. It will be shown that an intermediate region 32 having a chamfered edge blending the cruciform shape into the cylindrical portion also contributes to the tool life in this area.

In operation, the invention is highly contributory to efficient and nondestructive clamping of a wire to a workpiece. As mentioned above, the restricted mouth of the recess created by flaps 24 enables the clip to be preassembled to a wire in any number of locations on the wire so that a workman can place the assembled combination over the support surface and gently tap the unheaded upper region of the pins 34 to clamp the combined assembly to the surface. The unheaded region of the pin 34 insures that a single hammer blow may simultaneously exert force on the upper surface 14 of the block 12 as well as on the penetrating point 36. In view of the tight frictional contact provided by the cylindrical region 28 of the bore, the block 12 will retain its clamping engagement shown in FIG. 7, during normal vibration or other environmental forces which might contribute to the loosening of the clamp.

The positioning of the pins 34 diagonally of the block enables the embedment of the pins to be adjacent each of the end surfaces 20 and yet minimize the number of pins required. Such a positioning of the pins reduces the effects that a peel load on the fastened assembly would have on the clamping force on the wire.

Accordingly, this invention provides a simple and efficient wire clamping clip for securement of a wire to a support surface; and while specific embodiments of the various aspects of the invention have been disclosed, it will be understood that variations and modifications thereof may be effected without departing from the spirit and scope of the novel concepts disclosed and claimed herein.

I claim:

1. A wire clamping clip comprising a block member with substantially parallel workpiece engaging surface and exposed top surface, a recess formed in the workpiece engaging surface completely traversing said surface in a predetermined direction, means creating a predetermined restricted mouth opening for said recess which is of less transverse dimension than the maximum transverse dimension of the recess, protuberance means formed in a wall of said recess adapted to embed into the outer surface of an associated wire to be located in said recess, a pair of through bores formed in said block member located on opposing sides of said recess, a pair of pin members carried in said bores with top regions of the pins extending upwardly from the exposed top surface of the block member and penetrating point regions located within the respective bore so as to not substantially protrude beyond the workpiece engaging surface, the bores including differing cross-sectional configurations from the top surface to the workpiece engaging surface, the upper regions of the bores being cylindrical of a diameter substantially equal to the diameter of the pins providing a tight, retention fit between the two members, the lower regions of the bore including a plurality of circumferentially spaced rib-like wall surfaces providing continuously longitudinal engagement between the bore and the pin but permitting minimization of surface engagement between said elements in the lower region of the bores.

2. The wire clamping clip of claim 1 wherein the block member is rectangular and the length of the associated pins is generally at least twice the thickness of the block.

3. The wire clamping clip of claim 1 wherein the block member is of a plastic material.

4. The wire clamping clip of claim 1 wherein the block member is generally rectangular and the pins are located in a common plane extending generally diagonally of the generally rectangular block member.

5. The wire clamping clip of claim 1 wherein the lower regions of the bores are generally cruciform in cross section.

6. The wire clamping clip of claim 1 wherein the protuberance means is formed in the uppermost wall of the recess.

7. The wire clamping clip of claim 1 in combination with a wire to be clamped to a work surface through the use of said clip, the wire diameter being greater than the restricted mouth opening of the recess thus permitting the mouth opening to frictionally engage the wire to effect preassembly of the clip to said wire.

* * * * *